(12) United States Patent
Long

(10) Patent No.: US 9,222,578 B2
(45) Date of Patent: Dec. 29, 2015

(54) ELECTRO-HYDRAULIC CONTROL SYSTEM DIAGNOSTICS

(71) Applicant: Allison Transmission, Inc., Indianapolis, IN (US)

(72) Inventor: Charles F. Long, Pittsboro, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/231,300

(22) Filed: Mar. 31, 2014

(65) Prior Publication Data

US 2014/0209195 A1 Jul. 31, 2014

Related U.S. Application Data

(60) Division of application No. 13/550,426, filed on Jul. 16, 2012, now Pat. No. 8,690,732, which is a continuation of application No. 12/479,215, filed on Jun. 5, 2009, now Pat. No. 8,221,288.

(51) Int. Cl.

| *F16H 61/12* | (2010.01) |
|---|---|
| *F16H 61/02* | (2006.01) |
| *F16H 61/28* | (2006.01) |
| *F16H 59/72* | (2006.01) |
| *F16H 59/68* | (2006.01) |

(52) U.S. Cl.
CPC ............ *F16H 61/12* (2013.01); *F16H 61/0202* (2013.01); *F16H 61/2807* (2013.01); *F16H 59/72* (2013.01); *F16H 2059/683* (2013.01); *F16H 2061/1264* (2013.01); *Y10S 477/906* (2013.01); *Y10T 137/8158* (2015.04); *Y10T 137/8326* (2015.04); *Y10T 137/86485* (2015.04); *Y10T 477/6939* (2015.01)

(58) Field of Classification Search
CPC ............ F16H 61/12; F16H 2061/1208; F16H 61/0021; Y10T 477/6939
USPC ................. 477/97, 156, 158, 906; 73/115.02; 137/557; 303/122, 122.09, 122.1
See application file for complete search history.

(56) References Cited

U.S. PATENT DOCUMENTS

| 3,468,194 | A | 9/1969 | Horsch et al. |
|---|---|---|---|
| 6,364,811 | B1 | 4/2002 | Hubbard et al. |
| 6,382,248 | B1 | 5/2002 | Long et al. |
| 6,398,693 | B1 | 6/2002 | Kawamura |
| 6,659,899 | B2 | 12/2003 | Naunheimer |
| 6,907,970 | B2 | 6/2005 | Sugimura |
| 6,913,554 | B2 | 7/2005 | Younger |
| 6,966,862 | B2 | 11/2005 | Inuta |
| 7,314,128 | B2 | 1/2008 | Gunderson et al. |

(Continued)

OTHER PUBLICATIONS

International Search Report and Written Opinion of the International Searching Authority for PCT/US2010/037073, dated Aug. 2, 2010, 20 pages.

*Primary Examiner* — Roger Pang
(74) *Attorney, Agent, or Firm* — Barnes & Thornburg LLP

(57) ABSTRACT

Various embodiments of methods, apparatus and systems that diagnose and/or detect faults of an electro-hydraulic control system for a transmission are presented. Some embodiments, adjust a main line pressure of the electro-hydraulic control system and detect faults based upon changes in a pressure switch resulting from such adjustments of the main line pressure. The pressure switch may be incorporated into a control main valve or a clutch trim valve of the electro-hydraulic control system.

17 Claims, 6 Drawing Sheets

(56) References Cited

U.S. PATENT DOCUMENTS

| | | |
|---|---|---|
| 7,325,885 B2 | 2/2008 | Berger et al. |
| 7,481,500 B2 | 1/2009 | Miyazaki et al. |
| 7,693,638 B2 | 4/2010 | Costin et al. |
| 8,050,835 B2 | 11/2011 | Wilson et al. |
| 8,221,288 B2 | 7/2012 | Long |
| 2007/0049457 A1 | 3/2007 | Sato et al. |
| 2007/0099739 A1 | 5/2007 | Foster et al. |
| 2007/0186632 A1 | 8/2007 | Endo et al. |
| 2008/0119320 A1 | 5/2008 | Wu et al. |
| 2008/0176709 A1 | 7/2008 | Wu et al. |

ELECTRO-HYDRAULIC CONTROL SYSTEM DIAGNOSTICS

CROSS-REFERENCE TO RELATED U.S. PATENT APPLICATION

The present application is a divisional application of U.S. application Ser. No. 13/550,426, entitled "ELECTRO-HYDRAULIC CONTROL SYSTEM DIAGNOSTICS," which was filed on Jul. 16, 2012, which is a continuation application of U.S. application Ser. No. 12/479,215, now U.S. Pat. No. 8,221,288, which was filed on Jun. 5, 2009, the entirety of each of which is hereby incorporated by reference.

TECHNICAL FIELD

The present invention relates generally to electro-hydraulic control systems for transmissions, and more particularly to diagnostics for an electro-hydraulic control system of a transmission.

BACKGROUND

In general, an automatic transmission of a motor vehicle includes a number of selectively engageable friction elements (referred to herein as clutches). Selective engagement/disengagement of the clutches establish speed ratios between the transmission input shaft and the transmission output shaft. In particular, shifting from a currently established speed ratio to a new speed ratio generally involves disengaging a clutch (off-going clutch) associated with the current speed ratio and engaging a clutch (on-coming clutch) associated with the new speed ratio.

The torque capacity of a clutch (on-coming or off-going) involved in a shift is controlled by the fluid pressure that a clutch trim valve supplies to the clutch. The clutch trim valve receives a main line fluid pressure and supplies the clutch with a clutch feed pressure developed from the main line fluid pressure. In a typical system, an electronic control module (ECM) provides a solenoid valve of the clutch trim valve with a control signal. The control signal controls a pilot pressure of the solenoid valve which in turn controls the clutch feed pressure supplied to the clutch.

In such systems, the operation of one component generally depends upon the operation of other components. Accordingly, when troubles arise, identifying the faulty component or components is a difficult task and commonly requires a substantial amount of trial and error. As can be appreciated, such diagnostic techniques are time consuming and costly.

SUMMARY

According to one aspect of disclosed embodiments, a method for detecting faults in an electro-hydraulic control system for a transmission includes initiating a delivery of fluid to the electro-hydraulic control system. The method also include adjusting regulator control signals that request a main regulator valve of the electro-hydraulic control system to develop a main line pressure, and receiving status signals that indicate status of a pressure switch of the electro-hydraulic control system, status of the pressure switch being based upon the main line pressure. The method also includes detecting faults based upon regulator control signals and status signals indicative of status of the pressure switch, and generating one or more diagnostic signals that are indicative of detected faults.

According to some aspects, the method may detect a fault of the pressure switch in response to the status signals indicating the pressure switch is in an active state prior to initiating the delivery of fluid. The method may also cease the delivery of fluid to the electro-hydraulic control system, and detect a fault of the pressure switch in response to the status signals indicating the pressure switch is in an active state after ceasing the delivery of fluid.

In other aspects, adjusting regulator control signals may include generating regulator control signals that request the main regulator valve to increase the main line pressure from a nominal level to a first pressure level, and detecting faults may include detecting a fault of the electro-hydraulic control system in response to status signals indicating the pressure switch is in an inactive state and regulator control signals requested the main regulator valve to increase the main line pressure to the first pressure level. Adjusting regulator control signals may further include generating regulator control signals that request the main regulator valve to increase the main line pressure from the first pressure level to a second pressure level, and detecting faults may further include detecting a fault of the electro-hydraulic control system in response to status signals indicating the pressure switch is in an active state and regulator control signals requested the main regulator valve to increase the main line pressure to the second pressure level. Adjusting regulator control signals may also include generating regulator control signals that request the main regulator valve to reduce the main line pressure from the second pressure level to a third pressure level, and detecting faults may include detecting a fault of the electro-hydraulic control system in response to status signals indicating the pressure switch is in an inactive state and regulator control signals requested the main regulator valve to decrease the main line pressure to the third pressure level.

In another aspect, detecting faults may include detecting, based upon the regulator control signals and the status signals that indicate status of the pressure switch, that the pressure switch has failed to an open state, and generating one or more diagnostic signals may include generating one or more diagnostic signals that indicate the pressure switch has failed to the open state. Detecting faults may include detecting, based upon the regulator control signals and the status signals that indicate status of the pressure switch, that the pressure switch has failed to a closed state, and generating one or more diagnostic signals may include generating one or more diagnostic signals that indicate the pressure switch failed to the closed state. Detecting faults may further include detecting, based upon the regulator control signals and the status signals that indicate status of the pressure switch, that a fluid supply source failed to deliver fluid to the electro-hydraulic control system, and generating one or more diagnostic signals may also include generating one or more diagnostic signals that indicate the fluid supply source failed to deliver fluid to the electro-hydraulic control system.

In another aspect, detecting faults may include detecting, based upon the regulator control signals and the status signals that indicate status of the pressure switch, that the electro-hydraulic control system failed to increase the main line pressure above a threshold pressure level associated with the pressure switch, and generating one or more diagnostic signals may includes generating one or more diagnostic signals that indicate the electro-hydraulic control system failed to increase the main line pressure above the threshold pressure level. Detecting faults may also include detecting fluid leakage based upon the regulator control signals and the status signals that indicate status of the pressure switch, and generating one or more diagnostic signals may include generating one or more diagnostic signals that indicate fluid leakage detected. Detecting faults may also include detecting, based upon the regulator control signals and the status signals that indicate status of the pressure switch, that the electro-hydraulic control system failed to decrease the main line pressure below a threshold pressure level associated with the pressure switch, and generating one or more diagnostic signals may include generating one or more diagnostic signals that indicate the electro-hydraulic control system failed to decrease the main line pressure below the threshold pressure level.

In yet another aspect, an electro-hydraulic control system for a transmission includes a pressure switch, a plurality of valves, and an electronic control module. The pressure switch receives fluid, opens in response to a pressure level of the fluid being greater than a threshold pressure level, closes in response to the pressure of the fluid being less than the threshold pressure level, and generates a status signal that indicates status of the pressure switch. The plurality of valves develop a main line pressure based upon regulator control signals, develop a control main pressure based upon the main line pressure, and develop a clutch feed pressure based upon clutch control signals, the main line pressure, and the control main pressure. The plurality of valves further selectively deliver fluid at the control main pressure to the pressure switch based upon a pressure level of the main line pressure. The electronic control module generates regulator control signals to control the main line pressure, generates clutch control signals to control the clutch feed pressure, and detects faults based upon regulator control signals and status signals of the pressure switch.

In some aspects, the plurality of valves includes a control main valve to develop the control main pressure. The control main valve includes a port to receive the main line pressure, and a port to supply fluid at the control main pressure in response to receiving the main line pressure. The control main valve further includes the pressure switch and a valve member that selectively directs the control main pressure to the pressure switch based upon a pressure level of the main line pressure.

In other aspect, the plurality of valves includes a clutch trim valve to develop the clutch feed pressure based upon clutch control signals, the main line pressure, and the control main pressure. The clutch trim valve includes a port to receive the main line pressure, and a port to receive the control main pressure, and a port to supply the clutch feed pressure. The control main valve further includes the pressure switch and a valve member that selectively directs the control main pressure to the pressure switch based upon a pressure level of the main line pressure.

In some aspects, the electronic control module adjusts regulator control signal to increase the main line pressure from a nominal level to a first pressure level, and detects a fault in response to status signals indicating the pressure switch is open and regulator control signals requested the main line pressure be increased to the first pressure level. The electronic control module may further adjust regulator control signals to increase the main line pressure from the first pressure level to a second pressure level, and may detect a fault in response to status signals indicating the pressure switch is closed and regulator control signals requested the main line pressure be increased to the second pressure level. The electronic control module may further adjust regulator control signals to reduce the main line pressure from the second pressure level to a third pressure level, and may detect a fault in response to status signals indicating the pressure switch is open and regulator control signals requested the main line pressure be decreased to the third pressure level.

In some aspects, the electronic control module may detect based upon the regulator control signals and the status signals that a fluid supply source failed to deliver fluid. The electronic control module may also detect fluid leakage based upon the regulator control signals and the status signals.

BRIEF DESCRIPTION OF THE DRAWINGS

Embodiments described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. Furthermore, some reference labels may include a superscript and/or subscript to identify a particular item of a group of corresponding or analogous items; but such superscripts and/or subscripts may be omitted to refer to the group of items or a non-specific item of the group.

DETAILED DESCRIPTION

Figure 1:
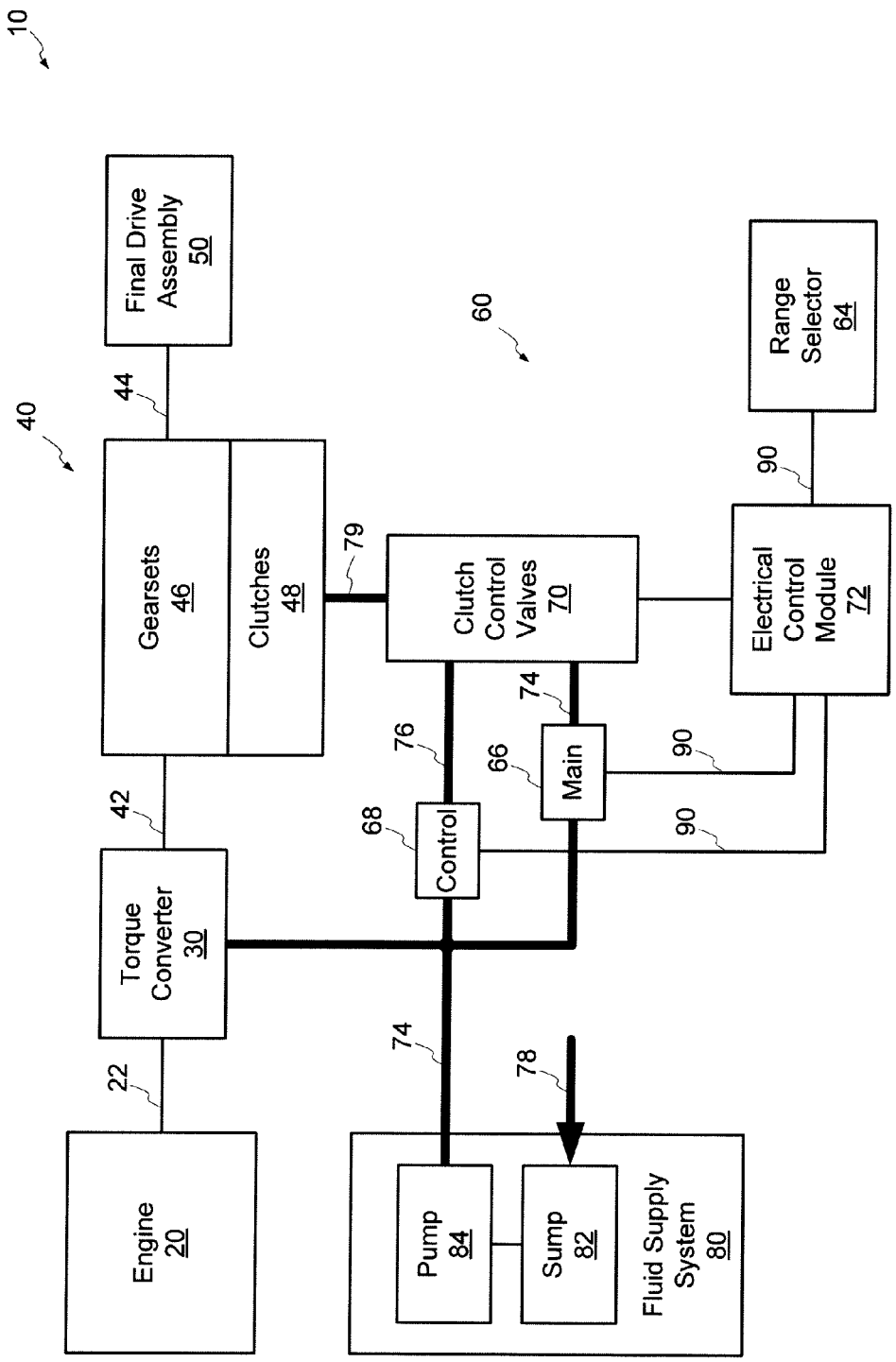
FIG. 1 shows an embodiment of a vehicle having a power train and a electro-hydraulic control system to selectively engage clutches of the power train.

Aspects of specific embodiments are presented by way of example in the drawings and described in detail. However, such aspects are susceptible to various modifications and alternative forms. Accordingly, the particular forms disclosed are not intended to be limiting, but on the contrary, the intention is to cover all modifications, equivalents, and alternatives falling within the spirit and scope of the invention as defined by the appended claims.

Specific details regarding aspects of illustrative embodiments are set forth in order to provide a more thorough understanding. However, some embodiments may practice such aspects without such specific details. In other instances, certain aspects have not been shown in detail in order not to obscure other aspects of the illustrative embodiments.

References in the specification to "one embodiment", "an embodiment", "an illustrative embodiment", etc., indicate that the embodiment described may include a particular feature, structure, or characteristic; however, other embodiments may not necessarily include the particular feature, structure, or characteristic. Moreover, such phrases are not necessarily referring to the same embodiment. When a particular feature, structure, or characteristic is described in connection with an embodiment, other illustrative embodiments may also include such a particular feature, structure, or characteristic whether or not explicitly described.

Embodiments may be implemented in hardware, firmware, software, or any combination thereof. Embodiments may also be implemented as instructions stored on a machine-readable medium, which may be read and executed by one or more processors. A machine-readable medium may include any mechanism for storing information in a form readable by a machine (e.g., a computing device). For example, a machine-readable medium may include read only memory (ROM); random access memory (RAM); magnetic disk storage media; optical storage media; flash memory devices; and others.

Details of the present invention may be described herein with reference to either normally high solenoids or normally low solenoids. A normally high solenoid develops or permits a high output pressure in response to receiving no electrical control signal or an electrical control signal having a low duty cycle. A normally high solenoid conversely develops a lower output pressure or prevents development of a high output pressure in response to receiving an electrical control signal or an electrical control signal with a high duty cycle. In contrast, a normally low solenoid develops or permits a high output pressure in response to receiving an electrical control signal or an electrical control signal with a high duty cycle. A normally low solenoid further develops a lower output pressure or prevents development of a high output pressure in response to receiving no electrical control signal or an electrical control signal having a low duty cycle. The following illustrated embodiments use normally low solenoids. However, one of ordinary skill in the art may readily replace one or more of the normally low solenoids of the illustrated embodiments with normally high solenoids and modify other aspects of the illustrated embodiments to account for the replacement.

Referring now to FIG. 1, a power train 10 of a vehicle is shown. The power train 10 includes an engine 20, a torque converter 30, a transmission 40, a final drive assembly 50, an electro-hydraulic control system 60, and a fluid supply system 80. The engine 20 may include a spark-ignited engine, a diesel engine, an electric hybrid engine (e.g. a combustion engine powering an electric generator that powers an electric engine), or the like. As shown, an output 22 of the engine 20 may be coupled to the torque converter 30, and the torque converter 30 may be coupled to an input shaft 42 of the transmission 40. The torque converter 30 generally receives torque from the engine output 22 and fluidically transfers the received torque to the transmission input shaft 42, thus permitting the rotation of the engine output 22 to differ from the rotation of the transmission input shaft 42. In some embodiments, the torque converter 30 may mechanically lock the engine output 22 to the transmission input shaft 42 once the input shaft 42 achieves a rotation rate similar to the rotation rate of the engine output 22.

As further shown, an output shaft 44 of the transmission 40 is coupled to the final drive assembly 50 that provides the vehicle with locomotion. The final drive assembly 50 may include wheels, continuous tracks, turbines, and/or other drive equipment. Further, the final drive assembly 50 may further include a transfer case to selectively deliver torque received via the transmission output shaft 44 to such wheels, continuous tracks, and/or other engine driven equipment. For example, the transfer case may selectively transfer torque to front wheels, back wheels, or all wheels of the vehicle.

The transmission 40 also includes gearsets 46 and clutches 48. The gearsets 46 and clutches 48 cooperate to provide a plurality of selectable speed ratios and output ranges between the input shaft 42 and the output shaft 44. For example, the gearsets 46 and clutches 48 may provide neutral ratios, multiple reverse speed ratios, and/or multiple forward speed ratios. In one embodiment, the transmission 40 includes three interconnected planetary gearsets 46 and five clutches 48 that are controllable to provide six forward speed ratios or "gears". Other configurations of gearsets 46 and clutches 48 are also possible.

The electro-hydraulic control system 60 controls operation of the transmission 40 and in particular the selected speed ratio between the input shaft 42 and the output shaft 44. As shown, the control system 60 includes a range selector 64, a main regulator valve 66, a control main valve 68, and several clutch trim valves 70. The control system 60 further includes an electronic control module (ECM) 72 to control and monitor the fluid supply system 80, the range selector 64, the main regulator valve 66, the control main valve 68, and the clutch trim valves 70.

The fluid supply system 80 is fluidically coupled to torque converter 30, the main regulator valve 66, the control main valve 68, and the clutch trim valves 70 via main lines or conduits 74. Further, the control main valve 68 is coupled to the clutch trim valves 70 via control lines or conduits 76.

The fluid supply system 80 includes a sump 82 coupled to various exhaust lines or conduits 78 in order to receive fluid collected from components of the power train 10 such as torque converter 30, transmission 40, clutches 48, and valves 66, 68, 70. The fluid supply system 80 includes an engine driven pump 84 coupled to main lines 74 to pump fluid from the sump 82 to components of the power train 10 such as the torque converter 30, transmission 40, clutches 48 and valves 66, 68, 70. As discussed in more detail below, the main regulator valve 66 and the clutch trim valves 70 are controlled by solenoids, such as variable bleed solenoids, on/off solenoids, or similar devices that regulate fluid pressure developed by the main regulator valve 66 and clutch trim valves 70.

As mentioned above, the ECM 72 controls and monitors various components of the power train 10. To this end, the ECM 72 is coupled to components of the power train 10 via one more links 90 such as wires, CAN networks and the like. Only a few illustrative links 90 are shown in FIG. 1 so as not to obscure other aspects of the illustrative embodiment. Via links 90, the ECM 72 provides components of the power train 10 with control signals to control their operation and may receive data or status signals from components of the power train 10 that provide information regarding their operation. For example, the ECM 72 may control operation of the transmission 40 based on status signals received from the engine 20, the torque converter 30, the transmission 40, the range selector 64, and/or other components. Such status signals may include electrical and/or analog signals received from sensors, controls or other like devices associated with the vehicle components. For instance, status signals may include signals indicative of transmission input speed, driver requested torque, engine output torque, engine speed, temperature of the hydraulic fluid, transmission output speed, turbine speed, brake position, gear ratio, torque converter slip, and/or other measurable parameters.

The ECM 72 may include computer circuitry such as one or more microprocessors and related elements configured to process executable instructions expressed in computer programming code or logic stored in one or more tangible computer readable media. The ECM 72 may also include analog to digital converters and/or other signal processing circuitry or devices to process one or more of the status signals received from the vehicle components. While shown in FIG. 1 as a single block, ECM 72 may be implemented as separate logical and/or physical structures. For example, the ECM 72 may be physically and/or logically separated from electronic controls for the transmission 40 or electronic controls for the engine 20. All or portions of the ECM 72 may alternatively or in addition be executed by a controller that is not on-board the vehicle, such as an external controller located at a transmission manufacturer or an assembly location.

As mentioned above the valves 66, 68, 70 regulate fluid pressure supplied to various components of the power train 10. In particular, the main regulator valve 66 generates an adjustable main line pressure MP, and the control main valve 68 develops a control main pressure CP in response to receiving fluid at the main line pressure MP. Moreover, each clutch trim valve 70 generates a clutch feed pressure CF for a respective clutch 48 based upon clutch control signals, the main line pressure MP, and the control main pressure CP.

The main regulator valve 66 may support a range (e.g. about 50-about 300 psi) of main line pressures MP. The ECM 72 may generate regulator control signals that cause the main regulator valve 66 to adjust the main line pressure MP to a desired main line pressure (e.g. about 200 psi). The main line pressure MP developed by the main regulator valve 66 is routed to various components via main lines 74 and may be used to hydraulically actuate components such as clutches 48. The control main valve 68 develops and supplies an intermediate control main pressure CP (e.g. about 50-about 100 psi) in response to receiving the main line pressure MP. Control lines 76 may provide fluid at the control main pressure CP to control various components of the electro-hydraulic control system 60. In particular, solenoids of the main regulator valve 66 and clutch trim valves 70 may receive fluid at the control main pressure CP and such solenoids may use the control main pressure CP to adjust the pressures developed by the main regulator valve 66 and clutch trim valves 70. Each clutch trim valve 70 may support a range of clutch feed pressures CF (e.g. about 0-about 300 psi). The ECM 72 may generate clutch control signals that cause each clutch trim valve 70 to adjust its clutch feed pressure CF to a desired clutch feed pressure CF. By varying the clutch control signals, the ECM 72 may fully engage, disengage and/or partially engage/disengage a clutch 48 of the transmission 40.

As mentioned above, the ECM 72 controls operation of the main regulator valve 66 via regulator control signals. In particular, the ECM 72 generates regulator control signals based upon shift requests, transmission temperature, solenoid specifications, and potentially other parameters. The relationship between regulator control signals and main line pressure MP is generally initially set according to specifications provided by the supplier or manufacturer of the main regulator valve 66. In particular, supplier specifications typically provide P/I curves, charts, or tables that relate the main line pressure MP developed by the main regulator valve 66 to the regulator control signals received by the main regulator valve 66. Thus, based upon such P/I curves, charts, or tables, the ECM 72 may generate regulator control signals to develop the main line pressure MP at a desired pressure level.

The ECM 72 may modulate or adjust the pressure level of the main line pressure MP for various reasons. For example, the ECM 72 may modulate the main line pressure MP to increase fluid flow through a cooler (not shown) during idle. The ECM 72 may also modulate the main line pressure MP to increase fuel economy of the vehicle. For example, the ECM 72 may lower the main line pressure MP to a level just above what is required to maintain clutch capacity in order to reduce fuel consumption.

Figure 2:
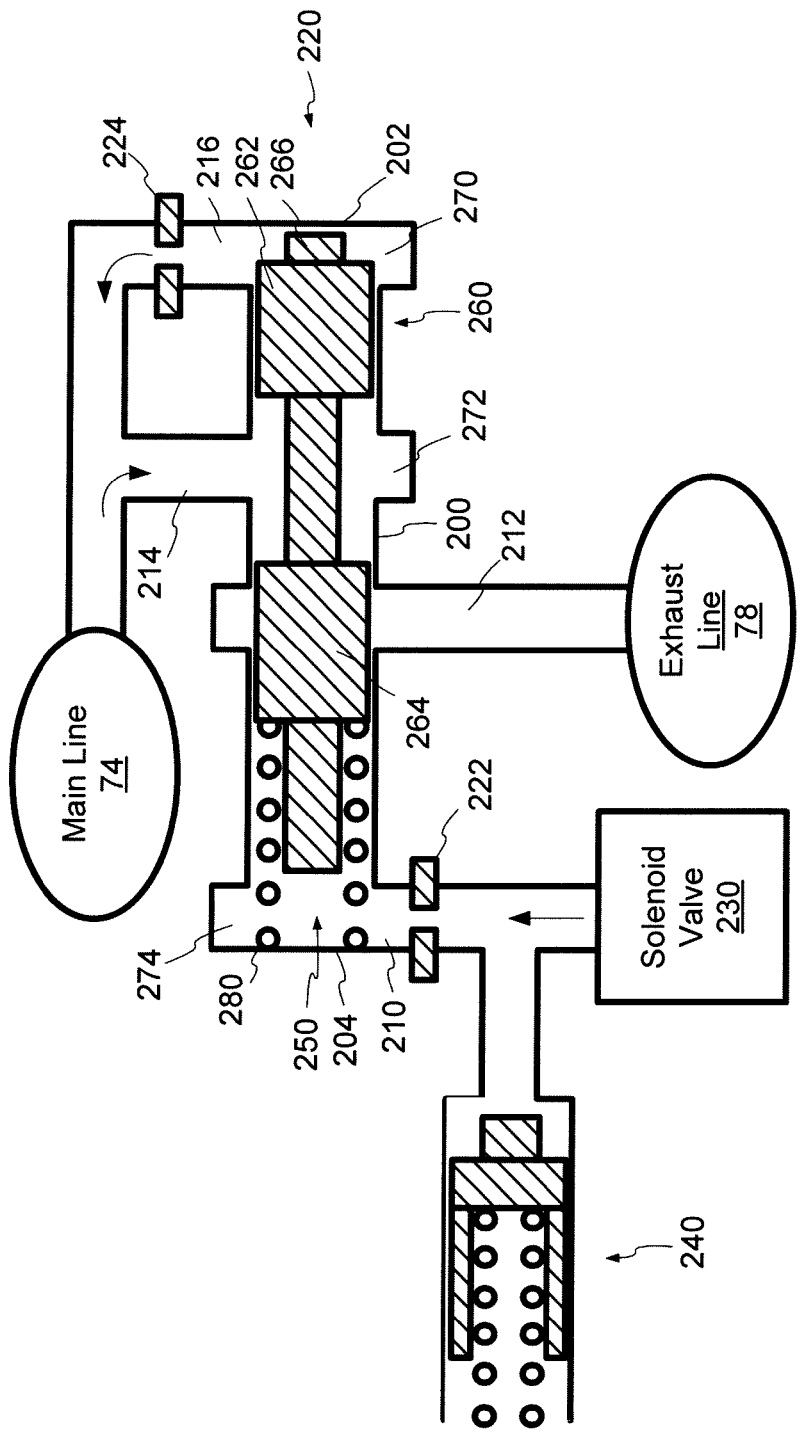
FIG. 2 shows an embodiment of a main regulator valve of the electro-hydraulic control system of FIG. 1.

Referring now to FIG. 2, further details regarding one embodiment of the main regulator valve 66 are presented. As shown, the main regulator valve 66 includes a pressure regulator valve 220, a solenoid valve 230 and an accumulator 240. The pressure regulator valve 220 includes a valve body 200 having a solenoid port 210, an overage port 212, a main line port 214, and a feedback port 216. The solenoid port 210 is coupled to the solenoid valve 230 and to the accumulator 240 via a restrictor 222. The overage port 212 may be coupled to exhaust lines 78 to return overage or fluid exhausted from the main regulator valve 66 to the sump 82 of the fluid supply system 80. The main line port 214 may be coupled to the fluid supply system 80 via main line 74. Likewise, the feedback port 216 may be coupled to the fluid supply system 80 via main line 74 and restrictor 224.

The valve body 200 further includes an axial valve bore 250 that fluidically couples the ports 210, 212, 214, and 216. The pressure regulator valve 220 further includes a valve member 260 positioned in axial bore 250 of the valve body 200. The valve member 260 includes an upper land 262 and a lower land 264 that effectively divide the valve bore 250 into an upper chamber 270 between the upper land 262 and an upper end 202 of the valve body 200, a middle chamber 272 between the lands 262, 264, and a lower chamber 274 between the lower land 264 and a lower end 204 of the valve body 200.

The valve member 260 is slideably moveable along the axial valve bore 250. In particular, a spring 280 positioned in the lower chamber 274 between the lower end 204 of the valve body 200 and the lower land 264 biases the valve member 260 toward the upper end 202 of the valve body 200 until a seat 266 of the valve member 260 rests against the upper end 202 of the valve body 200. A solenoid pressure supplied to the lower chamber 274 by the solenoid valve 230 biases the valve member 260 toward the upper end 202. Conversely, main line pressure MP supplied to the upper chamber 270 via feedback port 216 biases the valve member 260 toward the lower end 204 of the valve body 200. Thus, the valve member 260 moves toward the upper end 202 if the spring 280 and solenoid valve 230 exert a greater force upon the valve member 260 than the force exerted upon the valve member 260 by the main line pressure MP. Conversely, the valve member 260 moves toward the lower end 204 if the spring 280 and solenoid valve 230 exert a lesser force upon the valve member 260 than the force exerted upon the valve member 260 by the main line pressure MP.

As shown in FIG. 2, when the valve member 260 is positioned toward the upper end 202, the land 264 decouples the overage port 212 from the middle chamber 272. In such a position, the main line pressure MP created by the fluid supply system 80 is applied to the land 262 via the middle chamber 272. However, when the valve member 260 is moved toward the lower end 204, the land 264 moves past the overage port 212 thus venting the middle chamber 272 to the exhaust lines 78. Venting the middle chamber 272 to the exhaust lines 78 reduces the pressure in the middle chamber 272 and therefore reduces the main line pressure MP applied to the land 262. Venting of the middle chamber 272 occurs whenever the main line pressure is sufficient to overcome the biasing forces of spring 280 and the solenoid output pressure of valve 230. Accordingly, by controlling the fluid pressure in the lower chamber 274, the ECM 72 may regulate the main line pressure MP. To this end, the ECM 72 in one embodiment provides the solenoid valve 230 with regulator control signals that result in the solenoid valve 230 modulating the solenoid output pressure applied to the lower chamber 274 and thereby adjusting the position of the valve member 260 in the bore 250. Thus, the ECM 72 may modulate the main line pressure MP by causing the solenoid valve 230 to selectively connect the main line port 214 to the exhaust line 78.

As explained in more detail below, the ECM 72 implements a diagnostic method that detects certain faults in the electro-hydraulic control system 60 based upon status signals of a pressure switch. In one embodiment, the pressure switch is incorporated into the control main valve 66. In another embodiment, the pressure switch is incorporated into one of the clutch trim valves 70. Thus, it is envisioned that some embodiments of the electro-hydraulic control system 60 may include a conventional control main valve 68 without a pressure switch, a plurality of conventional clutch trim valves 70 without a pressure switch, and a clutch trim valve 70 with a pressure switch. It is further envisioned that some embodiments of the electro-hydraulic control system 60 may include the control main valve 68 with a pressure switch and a plurality of conventional clutch trim valves 70 without pressure switches. It is further envisioned that the electro-hydraulic control system 60 may include more than a single pressure switch in order to permit further diagnostics of the electro-hydraulic control system 60.

Figure 3:
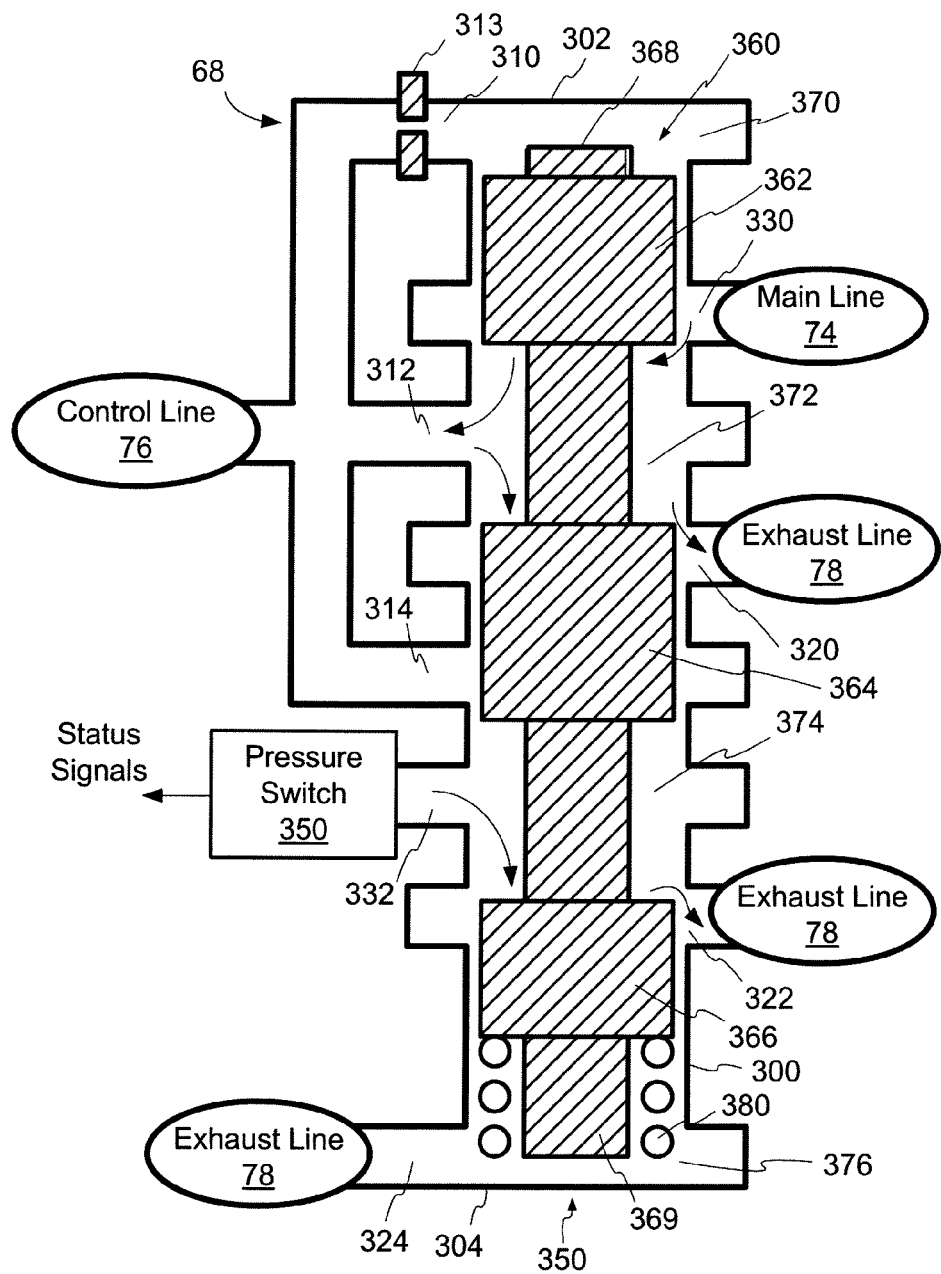
FIG. 3 shows an embodiment of a control main valve of the electro-hydraulic control system of FIG. 1 in a regulating position.

Referring now to FIG. 3, a control main valve 68 with a pressure switch 350 is shown that is suitable for the diagnostic method presented below in regard to FIG. 5. The control main valve 68 includes a valve body 300 having a feedback port 310, an upper control port 312, and a lower control port 314. The valve body 300 includes an upper exhaust port 320, a middle exhaust port 322, and a lower exhaust port 324. The valve body 300 further includes a main port 330 and a switch port 332. In one embodiment, a control line 76 of the electro-hydraulic control system 60 is coupled to the feedback port 310 via a restrictor 313. The control line 76 is also coupled to the upper control port 312 and the lower control port 314 of the valve body 300. The main line 74 is coupled to the main port 330, and the exhaust lines 78 are coupled to the exhaust ports 320, 322, 324.

The valve body 300 further includes an axial valve bore 350 that longitudinally traverses the valve body 300. The valve bore 350 fluidically couples the ports 310, 312, 314, 320, 322, 324, 330 and 332. The control main valve 68 further includes a valve member 360 positioned in axial bore 350 of the valve body 300. The valve member 360 includes an upper land 362, a middle land 364, and a lower land 366 that effectively divide the valve bore 350 into an upper chamber 370 between the upper land 362 and an upper end 302 of the valve body 300, an upper middle chamber 372 between the upper land 362 and the middle land 364, a lower middle chamber 374 between the middle land 364 and the lower land 366, and a lower chamber 376 between the lower land 366 and a lower end 304 of the valve body 300. Further, the valve member 360 is slideably moveable along the axial valve bore 350. In particular, a spring 380 positioned in the lower chamber 376 between the lower end 304 of the valve body 300 and the lower land 366 biases the valve member 360 toward the upper end 302 of the valve body 300 until a seat 368 of the valve member 360 rests against the upper end 302 of the valve body 300.

Figure 4:
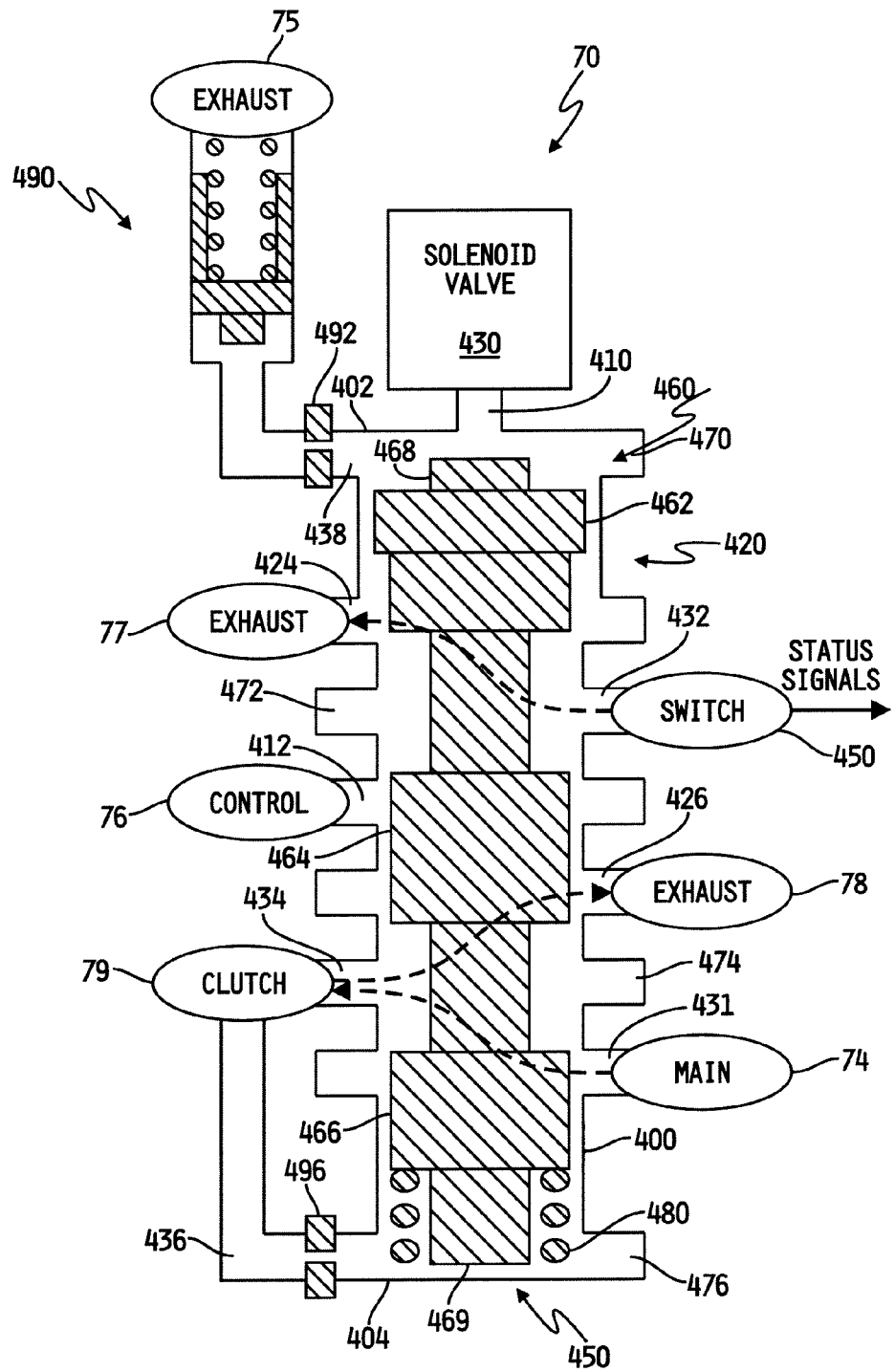
FIG. 4 shows an embodiment of a clutch trim valve of the electro-hydraulic control system of FIG. 1 in a regulating position.

The control main valve 68 has a non-regulating state (not shown), where the valve member 360 is fully stroked, i.e., positioned in the bore 350 such that the stem 369 of the valve member 360 rests against the lower end 304 of the body 300. FIG. 4 depicts the control main valve 68 in another non-regulating state where the valve member 360 is fully stroked, i.e., positioned in the bone 350 such that the seat 368 rests again the upper end 302 of the valve body 300. The control main valve 68 also has a regulating state as depicted in FIG. 3, in which the valve member 360 is positioned in the bore 350 such that the valve member 360 does not rest against either the upper end 302 or the lower end 304 of the body 300. Thus, in one embodiment, the control main valve 68 has a regulating state and two non-regulating states (e.g. a stroked state and a de-stroked state).

The control main valve 68 develops a control main pressure CP at a pressure level that is dependent upon the main line pressure MP supplied to the main line port 330. When no fluid is supplied to the control main pressure CP via the main line port 330, the spring 380 biases the valve member 360 toward the upper end 302, thus placing the control main valve 68 in the de-stroked non-regulating state. In the de-stroked state, the valve member 360 fluidically couples the main line 74 to the control line 76 via the upper middle chamber 372 while blocking the exhaust ports 320, 322. Accordingly, as fluid is introduced to the upper middle chamber 372 via the main line port 330, the valve member 360 directs the fluid to the upper control port 312 which further directs fluid to the pressure switch 350 via the lower control port 314 and the lower middle chamber 374. Pressurization of the pressure switch 350 changes the state of pressure switch 350, and may result in either issuance of or termination of an electrical signal by pressure switch 350 to ECM 72, depending upon the configuration of the switch.

As the main line pressure MP is increased, fluid is introduced to the upper chamber 370 via the upper middle chamber 372 and the ports 310, 312. The increased fluid pressure in the upper chamber 370 applies a downward force upon the valve member 360. Eventually, the pressure in the upper chamber 370 exerts a downward force upon the valve member 360 that is greater than the upward force of the spring 380. As a result of such force, the valve member 360 moves toward the lower end 304 of the valve body 300. As shown in FIG. 3, downward movement of the valve member 360 eventually decouples the main line port 330 from the upper middle chamber 372. Continual downward movement of the valve member 360 further couples the upper middle chamber 372 to exhaust port 320, thus exhausting fluid from the upper middle chamber 372 and reducing the fluid pressure in the upper middle chamber. Similarly, such downward movement of the valve member 360 further couples the lower middle chamber 374 to exhaust port 322, thus exhausting fluid from the lower middle chamber 372 and the pressure switch 350 and reducing the fluid pressure in the lower middle chamber 374. When the pressure switch 350 is fully exhausted, it changes states again. The change in state of pressure switch 350 results in either issuance of or termination of an electrical signal by pressure switch 350 to ECM 72.

As a result of the above arrangement of ports, valve member 360 and spring 380, the control main valve maintains or regulates the control main pressure CP at a substantially constant pressure level once the main line pressure MP is greater than a threshold pressure level (e.g. 100 psi). Above such threshold pressure level, the main line pressure MP places the control main valve 68 in the regulating state. In the regulating state, the valve member 360 vents the lower middle chamber 374 to the exhaust lines 78, thus venting fluid from the middle chamber 374 and the pressure switch 350. Further, the valve member 360 selectively vents the upper middle chamber 372 to the exhaust lines 78 to maintain the control main pressure CP at a predetermined pressure level (e.g. 100 psi). As the main line pressure increases, the control main valve 68 vents the upper middle chambers 372 to the exhaust lines 78 more frequently and as the main line pressure decreases, the control main valve 68 vents the middle chambers 372, 374 to the exhaust lines 78 less frequently.

As the main line pressure MP is decreased below the threshold pressure level, the valve member 360 moves toward the upper end 302, thus causing the lower middle chamber 374 and therefore the pressure switch 350 to receive fluid via the control port 314. The pressure switch 350 in one embodiment is designed to open in response to receiving fluid above a predefined pressure level and to close in response to the received fluid dropping below the predefined pressure level. However, it should be appreciated that the pressure switch 350 may alternatively be designed to close in response to receiving fluid above the predefined pressure level and to open in response to the received fluid dropping below the predefined pressure level. Moreover, the pressure switch 350 is designed to generate a status signal that indicates the state of the pressure switch 350 (e.g. opened or closed; activated or deactivated). Thus, due to the configuration of the control main valve 68 the status of the pressure switch 350 is dependent upon whether the control main valve 68 is in a regulating state or a non-regulating state. Accordingly, the status signal produced by the pressure switch 350 is indicative of whether the control main valve 68 is in a regulating state or a non-regulating state.

Referring now to FIG. 4, a clutch trim valve 70 with a pressure switch 450 is shown that is suitable for the diagnostic method described below in regard to FIG. 5. As shown, the clutch trim valve 70 is part of the clutch control valve assembly 70 of the electro-hydraulic control system 60. The clutch trim valve 70 includes a pressure regulator valve 420, a solenoid valve 430 and an accumulator 490. The pressure regulator valve 420 includes a valve body 400 having a solenoid port 410, a control port 412, exhaust ports 424, 426, a main port 431, a switch port 432, a clutch feed port 434, and a clutch feedback port 436. The solenoid port 410 is in fluid communication with the solenoid valve 430. The solenoid port 410 is also in fluid communication with the accumulator 490 via an accumulator port 438 and a restrictor 492. A control passage 76 is coupled to an upper middle chamber 472 of the pressure regulator valve 420 via the control port 412. Exhaust passages 77, 78 are coupled to the exhaust ports 424, 426, respectively. A main passage 74 is coupled to the main port 431, and a clutch passage 79 is coupled to a lower middle chamber 474 of the pressure regulator valve 420 via the clutch feed port 434. The clutch passage 79 is further coupled to a lower chamber 476 of the pressure regulator valve 420 via the clutch feedback port 436 and a restrictor 496.

The pressure regulator valve 420 has a valve member 460 that is axially translatable in a valve bore 450 of the valve body 400. The ports 410, 412, 414, 422, 424, 426, 430, 432, 434, 436, and 438 are in fluid communication with the valve bore 450. The valve member 460 includes an upper land 462, a middle land 464, and a lower land 466 that effectively divide the valve bore 450 into an upper chamber 470 between the upper land 462 and an upper end 402 of the valve bore 450, an upper middle chamber 472 between the upper land 462 and middle land 464, a lower middle chamber 474 between the middle land 464 and the lower land 466, and a lower chamber 476 between the lower land 466 and a lower end 404 of the valve bore 450.

A spring 480 is positioned in the lower chamber 476 between the lower end 404 of the valve bore 450 and the lower land 466. The spring 480 biases the valve member 460 toward the upper end 402 of the valve bore 450 until a seat 468 of the valve member 460 rests against the upper end 402 of the valve body 400. A clutch control pressure supplied to the upper chamber 470 by the solenoid valve 430 biases the valve member 260 toward the lower end 404. Conversely, main line pressure MP supplied to the lower middle chamber 474 via main line port 431 biases the valve member 460 toward the upper end 402 of the valve bore 450. Thus, the valve member 460 moves toward the upper end 402 if the spring 480 and fluid pressure in the main passage 74 exert a greater force upon the valve member 460 than the force exerted upon the valve member 460 by the clutch control pressure. Conversely, the valve member 260 moves toward the lower end 404 if the spring 480 and fluid pressure in the main passage 74 exert a lesser force upon the valve member 460 than the force exerted upon the valve member 460 by the clutch control pressure.

When the valve member 460 is destroked, i.e., positioned toward the upper end 402, the lower land 466 decouples the main port 431 from the lower middle chamber 474. The position of middle land 464 couples the exhaust port 426 to the lower middle chamber 474. In such a position, the valve member 460 vents the clutch passage 79 to the exhaust passage 78 via the lower middle chamber 474, thus reducing the fluid pressure in the lower middle chamber 474 and the clutch feed pressure CF in the clutch passage 79.

When the valve member 460 is stroked, i.e., moved toward the lower end 404, the position of the middle land 464 decouples the lower middle chamber 474 from the exhaust port 424 and the position of the lower land 466 exposes the lower middle chamber 474 to the main port 431, thus raising the pressure level of the lower middle chamber 474 and the clutch feed pressure CF in the clutch passage 79. Accordingly, by controlling the position of the valve member 460 of the clutch trim valve 70, the ECM 72 may regulate or otherwise control the clutch feed pressure CF developed by the clutch trim valve 70. To this end, the ECM 72 in one embodiment provides the solenoid valve 430 with clutch control signals that result in the solenoid valve 430 modulating the clutch control pressure applied to the upper chamber 470 and thereby adjusting the position of the valve member 460 in the bore 450. Thus, the ECM 72 may modulate the clutch feed pressure CF by causing the solenoid valve 430 to selectively exhaust the lower middle chamber 474 to the exhaust line 78. FIG. 4 shows the clutch trim valve 70 in such a modulating or regulating state.

In summary, the clutch trim valve 70 may be in a de-stroked state where the valve member 460 is positioned in the bore 450 such that the seat 468 rests against the upper end 402 of the valve body 400. The clutch trim valve 70 may conversely be in a stroked state where the valve member 460 is positioned in the bore 450 such that the stem 469 of the valve member 460 rests against the lower end 404 of the valve body 400. The clutch trim valve 70 may further be placed into a regulating state as depicted in FIG. 4 in which the valve member 460 is positioned in the bore 450 such that no portion of the valve member 460 rests against either the upper end 402 or the lower end 404 of the body 400. Thus, in one embodiment, the clutch trim valve 70 has a regulating state and two non-regulating states (e.g. a stroked non-regulating state and a de-stroked non-regulating state).

When the valve 420 is fully stroked, the control passage 76 is coupled to the upper middle chamber 472 and thereby pressurizes the pressure switch 450. Thus, fully stroking of the valve 420 causes the pressure switch 450 to change state (i.e., to either issue or cease issuing an electrical signal to the ECM 72, depending on the configuration of the switch).

Assuming a constant main line pressure MP, as the solenoid valve 430 increases the clutch control pressure applied to the upper chamber 470, the increased fluid pressure in the upper chamber 470 applies a downward force upon the valve member 460. Eventually, the pressure in the upper chamber 470 exerts a downward force upon the valve member 460 that is greater than the upward force of the spring 480. As a result of such force, the valve member 460 moves toward the lower end 404 of the valve body 400. Downward movement of the valve member 460 eventually decouples the control line 76 and the pressure switch 450 from the upper middle chamber 472 causing the pressure switch 450 to change state as described above. Downward movement of the valve member 460 further decouples the lower middle chamber 474 from the exhaust port 424 and to the main line 74, thus increasing the pressure level in the lower middle chamber 474.

The increased pressure in the lower middle chamber 474 provides an upward force upon the valve member 460. Such increased pressure causes the valve member 460 to translate upward thereby venting the lower middle chamber 474 to the exhaust passage 78 via port 426. As a result of the above arrangement of ports, valve member 460 and spring 480, the clutch control valve 70 maintains or regulates the clutch feed pressure CF at a substantially constant pressure level for a given clutch control signal when the main line pressure MP is greater than a threshold pressure level (e.g. about 130 psi). Above such threshold pressure level, the main line pressure MP places the clutch trim valve 70 in the regulating state shown in FIG. 4.

When the pressure regulator valve 420 transitions from either of the non-regulating states to the regulating state, the land 464 decouples the upper middle chamber 472 from the control passage 76, thereby depressurizing the pressure switch 450. As a result, the pressure switch 450 changes state (i.e., it either begins issuing or ceases issuing an electrical signal to the ECM 72, depending on the configuration of the switch). Thus, the pressure switch 450 changes state each time the valve 420 changes from the regulating state to a non-regulating state or vice versa.

While in the regulating state, the valve member 460 dithers, thereby selectively venting the lower middle chamber 474 to the exhaust line 78 to maintain the clutch feed pressure CF at a predetermined pressure level (e.g. about 130 psi). As the main line pressure increases, the clutch trim valve 70 vents the lower middle chamber 474 to the exhaust line 78 more frequently and as the main line pressure MP decreases, the clutch trim valve 70 vents the lower middle chamber 474 to the exhaust line 78 less frequently.

Figure 5:
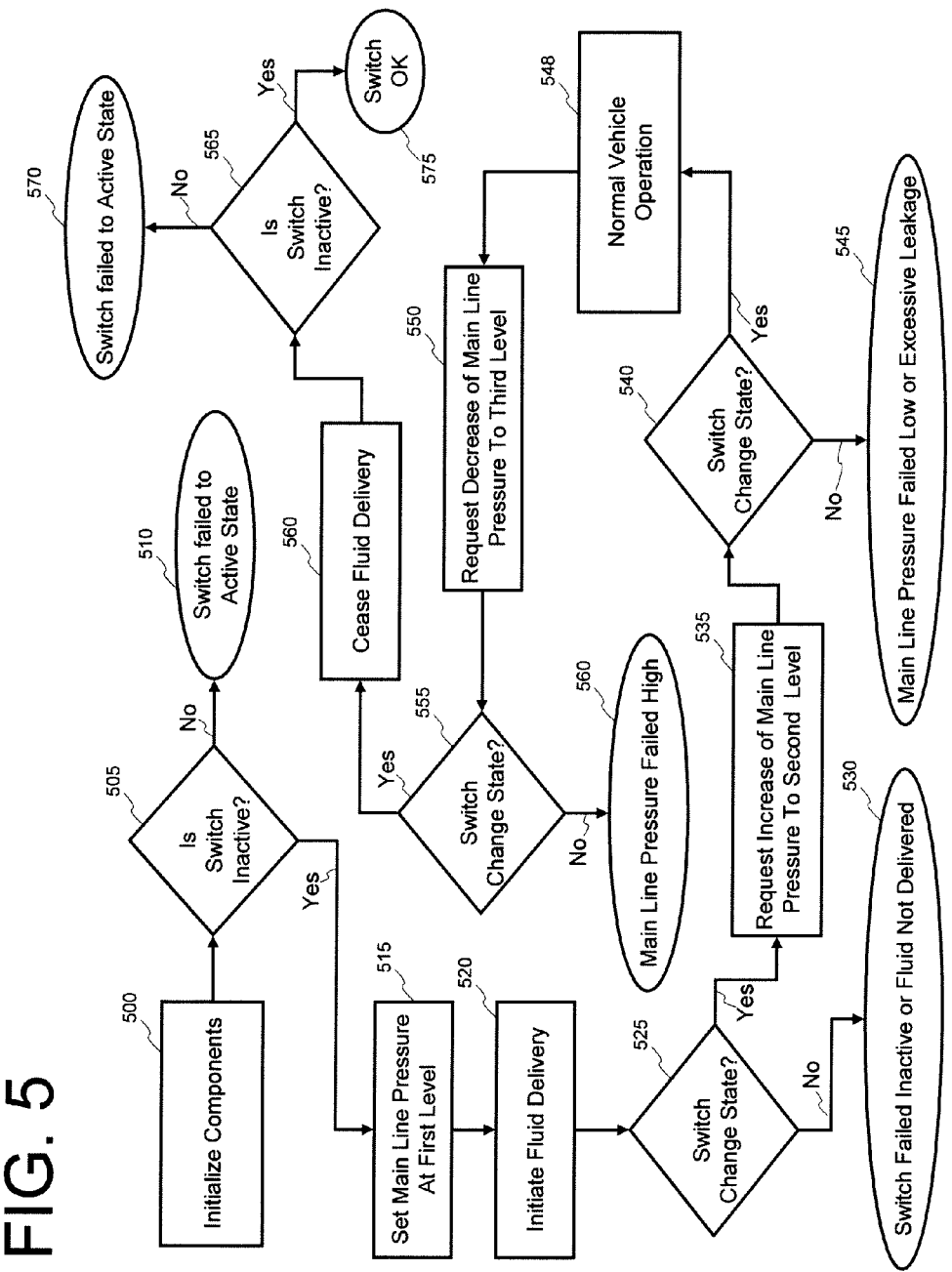
FIG. 5 shows a flowchart for an embodiment of a diagnostic method for the electro-hydraulic control system of FIG. 1.
Figure 6:
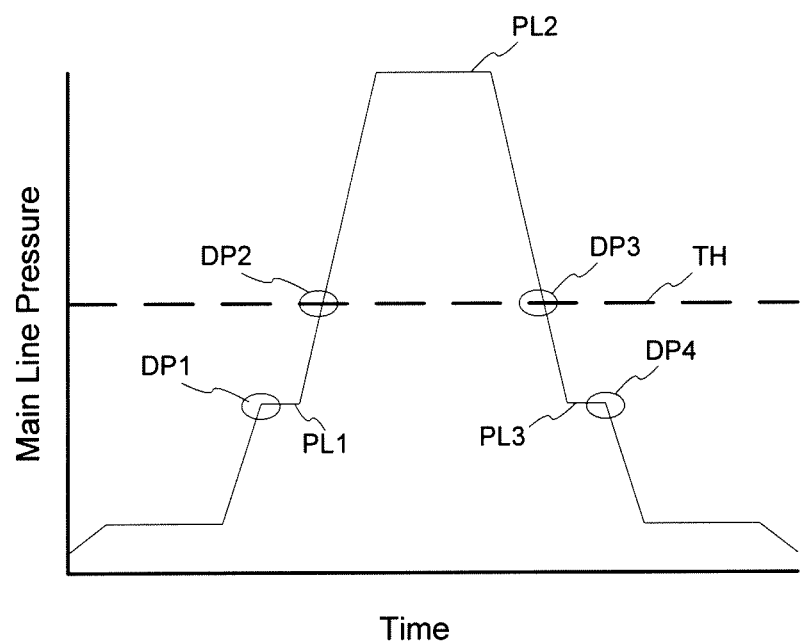
FIG. 6 shows a graph of main line pressure in response to the diagnostic method of FIG. 5.

Referring now to FIGS. 5 and 6, an embodiment of a diagnostic method suitable for detecting certain faults of the electro-hydraulic system 60 is presented. At block 500, the ECM 72 initializes various components of the power train 10. For example, in an embodiment, where the pressure switch is incorporated into a clutch trim valve 70, the ECM 72 may generate clutch control signals that open the solenoid valve 430 and thus define a threshold pressure level between a regulating and a non-regulating state of the clutch trim valve 70. In one embodiment, the ECM 72 performs such initialization in response to a key being placed in an ignition of the vehicle; however, other events such as turning the ignition, pressing a button, opening a door, etc. may also or alternatively trigger initialization.

At block 505, the ECM 72 determines whether the pressure switch (e.g. 350, 450) is inactive (e.g. closed) based upon electrical status signals received from the pressure switch. In one embodiment, the pressure switch is implemented such the pressure switch is closed when not receiving fluid above an activating pressure level. However, it should be appreciated that the pressure switch (e.g. 350, 450) may be implemented so that it closes when activated by fluid above the activating pressure level.

At block 505, the ECM 72 has not yet requested the fluid supply system 80 to supply fluid to the electro-hydraulic control system 60. Therefore, the pressure switch should be inactive (e.g. closed). Accordingly, in response to determining that the pressure switch is active, the ECM 72 at block 510 may determine that the pressure switch has failed to an active state (e.g. failed open).

If the status signal indicates the pressure switch is inactive, the ECM 72 at block 515 sets the main line pressure to a first pressure level PL1 and initiates at block 520 delivery of fluid from the fluid supply system 80 to the electro-hydraulic control system 60. In one embodiment, the ECM 72 at block 515 generates regulator control signals that request the main regulator valve 66 to increase the main line pressure MP to a first pressure level PL1 that is less than a threshold pressure level TH of the valve with the pressure switch (e.g. control main valve 68 or the clutch trim valve 70). Moreover, the ECM 72 at block 515 generates regulator control signals that request the first pressure level PL1 be sufficient to fill the electro-hydraulic control system 60 with fluid. Thus, due to setting the first pressure level PL1 in this manner, the ECM 72 ensures that fluid is delivered to components of the electro-hydraulic control system 60 and especially to the pressure switch while also ensuring that the valve with the pressure switch remains in a non-regulating state.

As noted above, the pump 84 of the fluid supply system 80 is engine driven. Accordingly, the ECM 72 and/or other controller of the vehicle at block 520 generates control signals that cause the fluid supply system 80 to deliver fluid to the electro-hydraulic control system 60 in response to cranking and/or igniting the engine 20. In particular, the ECM 72 and/or another controller of the vehicle may generate control signals that crank and ignite the engine 20 in response to a user turning an ignition key. Thus, upon igniting the engine 20, the pump 84 delivers fluid to the main regulator valve 66. The main regulator valve 66 in turn delivers fluid to main lines 74 and increases the main line pressure MP from a nominal pressure level to the first pressure level PL1 (e.g. 50 psi) specified by regulator control signals received from the ECM 72.

At block 525, the ECM 72 determines based upon status signals from the pressure switch whether the pressure switch changed states at a first diagnostic point DP1. See, FIG. 6. In particular, the ECM 72 in one embodiment determines at block 525 whether the pressure switch transitioned from the inactive state (e.g. closed state) to the active state (e.g. open state).

In an embodiment, where the pressure switch is incorporated into the control main valve 68, the control main valve 68 remains in a de-stroked state due to the main line pressure MP being at the first pressure level PL below the threshold pressure level TH for the control main valve 68. Accordingly, assuming normal operation, the main line 74 delivers fluid to the pressure switch via ports 312, 314 and chambers 372, 374. Thus, if the ECM 72 determines at block 525 that the pressure switch 350 does not enter its active state (e.g. open state), then the ECM 72 detects a fault in the electro-hydraulic control system 60 at block 530 and may provide signals and/or other indicators of such detected fault. In particular, the ECM 72 may indicate that the pressure switch 350 has failed to the inactive state (e.g. failed closed) and/or that fluid was not delivered to the electro-hydraulic control system 60. For example, the pump 84 may not be primed, thus preventing delivery of fluid to the electro-hydraulic control system 60.

Similarly, in an embodiment, where the pressure switch is incorporated into a clutch trim valve 70, the clutch trim valve 70 remains in a de-stroked state due to the main line pressure MP being at the first pressure level PL below the threshold pressure level TH for the clutch trim valve 70. Accordingly, assuming normal operation, the control line 76 delivers fluid to the pressure switch 450 via ports 412, 414, 432 via upper middle chamber 472. Thus, if the ECM 72 determines at block 525 that the pressure switch 450 does not enter its active state (e.g. open state), then the ECM 72 detects a fault in the electro-hydraulic control system 60 at block 530 and may provide signals and/or other indicators of such detected fault.

In response to determining that the pressure switch has transitioned from the inactive state (e.g. closed) to the active state (open) at a first diagnostic point DP1, the ECM 72 at block 535 generates regulator control signals that request the main regulator valve 66 to increase the main line pressure MP to a second pressure level PL2 (e.g. 200 psi). As a result of increasing the main line pressure MP above the threshold pressure level TH for the valve with the pressure switch, the valve should transition from a non-regulating state to a regulating state, thus causing its pressure switch to transition from an active state (e.g. open) to an inactive state (e.g. closed). In particular as shown in FIG. 3, the valve member 360 of the control main valve 66 decouples the control line 76 from the pressure switch 350 in the regulating state. Likewise, as shown in FIG. 4, the valve member 460 of the clutch trim valve 70 decouples the control line 76 from the pressure switch 450 in the regulating state.

Thus, the ECM 72 at block 540 determines whether the pressure switch changed states at a second diagnostic point DP2. In particular, the ECM 72 in one embodiment at block 540 determines based upon the status signal of the pressure switch whether the pressure switch transitioned from an active state (e.g. open) to an inactive state (e.g. closed). If the ECM 72 determines that the pressure switch did not change state at the second diagnostic point DP2, then the ECM 72 detects a fault in the electro-hydraulic control system 60 at block 545 and may provide signals and/or other indicators of such detected fault. In particular, the ECM 72 may indicate that the electro-hydraulic control system 60 has failed to increase the main line pressure MP to the second pressure level PL2 (i.e. the main line pressure MP has failed low) and/or that the electro-hydraulic control system 60 may be experiencing excessive fluid leakage.

If the ECM 72 determines that the pressure switch changed states at the second diagnostic point DP2, then the ECM 72 may proceeds with normal operation of the electro-hydraulic control system 60 at block 548. At block 550, the ECM 72 may generate regulator control signals that request the main regulator valve 66 to reduce the main line pressure MP to a third pressure level PL3 in anticipation of turning the vehicle off, in response to a request to turn the engine off, and/or in response to another event. For example, the ECM 72 may request the main regulator valve 66 to reduce the main line pressure MP to the third pressure level PL3 in response to a user placing the vehicle in a parked state and/or turning an ignition key to an off state.

In one embodiment, the ECM 72 generates regulator control signals that request the main regulator valve 66 to reduce the main line pressure MP to a third pressure level PL3 (e.g. 50 psi) that is less than the threshold pressure level TH and that is sufficient to fill the electro-hydraulic control system 60 with fluid. In some embodiments, the third pressure level PL3 requested by the ECM 72 is the same as the second pressure level PL2; however, the third pressure level PL3 may differ from the second pressure level PL2 in other embodiments.

As explained above in regard to the second pressure level PL2, the valve with the pressure switch should transition from a regulating state to a non-regulating state in response to the main line pressure MP being decreased to the third pressure level PL3. Moreover, the pressure switch should transition from an inactive state (e.g. closed) to an active state (e.g. open) in response to the valve transitioning to the non-regulating state. Accordingly, the ECM 72 at block 555 determines whether the pressure switch changed states at a third diagnostic point DP3. In particular, the ECM 72 in one embodiment at block 555 determines based upon the status signal of the pressure switch whether the pressure switch transitioned from an inactive state (e.g. closed) to an active state (e.g. open). If the ECM 72 determines that the pressure switch did not change state at the third diagnostic point DP3, then the ECM 72 detects a fault in the electro-hydraulic control system 60 at block 560 and may provide signals and/or other indicators of such detected fault. In particular, the ECM 72 may indicate that the electro-hydraulic control system 60 has failed to reduce the main line pressure MP to the third pressure level PL3 (i.e. the main line pressure MP has failed high).

If the ECM 72 determines that the pressure switch changed states at the third diagnostic point DP3, then the ECM 72 and/or another controller of the vehicle may cause the fluid supply system 80 to cease deliver of fluid to the electro-hydraulic control system 60. In particular, the ECM 72 and/or another controller of the vehicle may generate signals that cause the engine 20 to turn off. As mentioned above, the pump 84 is engine driven. Accordingly, the fluid supply system 60 ceases to supply fluid to the electro-hydraulic control system 60 in response to the engine 20 being turned off. Thus, the main line pressure MP is further reduced from the third pressure level PL3 to a nominal pressure level. At the nominal pressure level, the pressure switch (e.g. 350, 450) should return to an inactive state since the control main pressure CP delivered via the control lines 76 is substantially reduced.

Accordingly, the ECM 72 at block 565 determines whether the pressure switch changed states at a fourth diagnostic point DP4. In particular, the ECM 72 in one embodiment at block 565 determines based upon the status signal of the pressure switch whether the pressure switch transitioned from an active state (e.g. open) to an inactive state (e.g. closed). If the ECM 72 determines that the pressure switch did not change state at the fourth diagnostic point DP4, then the ECM 72 detects a fault in the electro-hydraulic control system 60 at block 570 and may provide signals and/or other indicators of such detected fault. In particular, the ECM 72 may indicate that the pressure switch of the electro-hydraulic control system 60 has failed to an active state (e.g. failed open). Conversely, if the ECM 72 determines that the pressure switch of the electro-hydraulic control system 60 has changed state at the fourth diagnostic point DP4, the ECM 72 may indicate that the pressure switch appears to be operating normally at block 575.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. An electro-hydraulic control system for a transmission, the electro-hydraulic control system comprising:
   an electronic control module configured to (i) generate control signals to increase a main line pressure of the electro-hydraulic control system from a nominal level to a first pressure level and control signals to increase the main line pressure from the first pressure level to a second pressure level, (ii) receive a status signal indicative of a status of a pressure switch of the electro-hydraulic control system at the first pressure level or the second pressure level, and (iii) detect a fault as a function of a lack of change in the status of the pressure switch at the first pressure level or the second pressure level.

2. The electro-hydraulic control system of claim 1, wherein the electronic control module is to detect a fault in response to the status of the pressure switch failing to change from an inactive state to an active state at the first pressure level.

3. The electro-hydraulic control system of claim 2, wherein the electronic control module is to detect a fault in response to the status of the pressure switch failing to change from the active state to the inactive state at the second pressure level.

4. The electro-hydraulic control system of claim 3, wherein the electronic control module is to (i) generate control signals to decrease the main line pressure from the second pressure level to a third pressure level, (ii) receive a status signal indicative of a status of the pressure switch at the third pressure level, and (iii) detect a fault in response to the status of the pressure switch failing to change from the inactive state to the active state at the third pressure level.

5. The electro-hydraulic control system of claim 4, wherein the electronic control module is to (i) generate control signals to decrease the main line pressure from the third pressure level to a fourth pressure level, (ii) receive a status signal indicative of a status of the pressure switch at the fourth pressure level, and (iii) detect a fault in response to the status of the pressure switch failing to change from the active state to the inactive state at the fourth pressure level.

6. The electro-hydraulic control system of claim 2, wherein the fault indicates that fluid was not delivered to the electro-hydraulic control system.

7. The electro-hydraulic control system of claim 3, wherein the fault indicates that the electro-hydraulic control system is experiencing fluid leakage.

8. The electro-hydraulic control system of claim 4, wherein the electronic control module is configured to generate the regulator control signals to decrease the main line pressure from the second pressure level to the third pressure level in response to receipt of a request to turn off an engine of a vehicle associated with the transmission.

9. The electro-hydraulic control system of claim 4, wherein the electronic control module is configured to cause delivery of fluid to the electro-hydraulic control system to cease in response to the status signal indicating a change from the inactive state to the active state at the third pressure level.

10. The electro-hydraulic control system of claim 5, wherein the fourth pressure level is the nominal level.

11. The electro-hydraulic control system of claim 5, wherein the electronic control module is configured to generate the regulator control signals to decrease the main line pressure from the third pressure level to the fourth pressure level in response to receipt of a request to turn off an engine of a vehicle associated with the transmission.

12. An electro-hydraulic control system for a transmission, the electro-hydraulic control system comprising:
an electronic control module configured to (i) generate control signals to increase a main line pressure of the electro-hydraulic control system from a nominal level to a first pressure level and control signals to increase the main line pressure from the first pressure level to a second pressure level, (ii) receive a status signal indicative of a status of a pressure switch of the electro-hydraulic control system at each of the first pressure level and the nominal pressure level, and (iii) detect a fault as a function of a lack of change in the status of the pressure switch at the first pressure level or the nominal pressure level.

13. The electro-hydraulic control system of claim 12, wherein the electronic control module is configured to detect the fault in response to the status of the pressure switch failing to change from an inactive state to an active state at the first pressure level.

14. The electro-hydraulic control system of claim 12, wherein the electronic control module is configured to detect the fault in response to the status of the pressure switch at the nominal pressure level failing to be in an inactive state.

15. The electro-hydraulic control system of claim 12, wherein the electronic control module is configured to detect the fault in response to the status of the pressure switch at the nominal pressure level failing to be in an active state.

16. The electro-hydraulic control system of claim 12, wherein the fault indicates that fluid was not delivered to the electro-hydraulic control system.

17. The electro-hydraulic control system of claim 12, wherein the electronic control module is configured to detect fluid leakage based on the control signals and the status signal.

* * * * *